(12) United States Patent
Bender et al.

(10) Patent No.: US 6,201,879 B1
(45) Date of Patent: *Mar. 13, 2001

(54) METHOD AND APPARATUS FOR LOGO HIDING IN IMAGES

(75) Inventors: Walter Bender, Auburndale, MA (US); Norishige Morimoto, Tokyo (JP); Daniel Gruhl, Cambridge, MA (US)

(73) Assignee: Massachusetts Institute of Technology, Cambridge, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/594,884

(22) Filed: Feb. 9, 1996

(51) Int. Cl.[7] ....................................................... G06K 9/00
(52) U.S. Cl. .............................................................. 382/100
(58) Field of Search ................................... 382/232, 284; 395/135; 358/454, 448, 142, 124, 450; 380/4, 23, 25, 54; 283/6, 93, 94; 348/475; 235/494

(56) References Cited

U.S. PATENT DOCUMENTS

| | | | |
|---|---|---|---|
| 3,914,877 | * 10/1975 | Hines | 283/7 |
| 4,310,180 | * 1/1982 | Mowry, Jr. et al. | 283/8 B |
| 4,389,671 | * 6/1983 | Posner et al. | 358/124 |
| 4,933,880 | * 6/1990 | Borgendale et al. | 364/523 |
| 5,041,992 | * 8/1991 | Cunningham et al. | 395/135 |
| 5,060,171 | * 10/1991 | Steir et al. | 395/135 |
| 5,171,040 | * 12/1992 | Orndorff | 283/93 |
| 5,196,922 | * 3/1993 | Yeomans | 395/135 |
| 5,222,202 | * 6/1993 | Koyamada | 395/123 |
| 5,243,423 | * 9/1993 | De Jean et al. | 358/142 |
| 5,325,449 | * 6/1994 | Bur et al. | 382/284 |
| 5,337,361 | * 8/1994 | Wang et al. | 380/51 |
| 5,337,362 | * 8/1994 | Gormish et al. | 380/54 |
| 5,374,976 | * 12/1994 | Spannenburg | 355/201 |
| 5,377,024 | * 12/1994 | Dillinger | 358/448 |
| 5,377,314 | * 12/1994 | Bates et al. | 395/135 |
| 5,396,559 | * 3/1995 | McGrew | 380/254 |
| 5,398,283 | * 3/1995 | Virga | 380/18 |
| 5,461,426 | * 10/1995 | Limberg et al. | 348/475 |
| 5,473,737 | * 12/1995 | Harper | 395/135 |
| 5,481,653 | * 1/1996 | Kashiwagi et al. | 395/135 |
| 5,488,674 | * 1/1996 | Burt et al. | 382/284 |
| 5,537,223 | * 7/1996 | Curry | 358/454 |
| 5,572,010 | * 11/1996 | Petrie | 235/494 |
| 5,581,377 | * 12/1996 | Shimizu et al. | 358/540 |
| 5,606,609 | * 2/1997 | Houser et al. | 380/4 |
| 5,721,788 | * 2/1998 | Powell et al. | 382/100 |

FOREIGN PATENT DOCUMENTS

0581317 * 2/1994 (EP) ................................. G07D/7/00

* cited by examiner

Primary Examiner—Jose L. Couso
(74) Attorney, Agent, or Firm—Testa, Hurwitz & Thibeault LLP

(57) ABSTRACT

A method of hiding a figure in an image replaces information from a figure-shaped portion of the image with information from another location having similar texture. The relative insensitivity of the eye to discontinuities in texture patterns having a significant high-frequency or random component minimizes the perceptibility of the replacement. The figure is revealed by autocorrelating the image containing the repeated information, and subtracting the image from a copy of itself shifted according to the arguments creating large value of the autocorrelation function.

87 Claims, 6 Drawing Sheets

METHOD AND APPARATUS FOR LOGO HIDING IN IMAGES

FIELD OF THE INVENTION

This invention relates to steganography. More particularly, this invention relates to techniques for embedding inconspicuous and readily recoverable figures in still images.

BACKGROUND OF THE INVENTION

A well-known, time-honored method of incorporating creatorship information into a work of art is the application of a signature to the work itself. In the case of a two-dimensional image, such as a photograph, the signature typically obliterates the information it overlies, and is therefore applied to a peripheral portion of the image. Although the signature has the desirable attribute of ready availability to anyone possessing the image, it may interfere with proper use of the image or be otherwise distracting or annoying to the viewer. This problem also persists in the realm of digitally represented data, in which it would be desirable, for example, to mark photographs or other types of images as proprietary material before electronic publication or distribution through on-line services, or to vary the signatures marking different versions in order to identify different routes of distribution.

Data hiding is a class of processes used to embed recoverable (e.g., signature) data in digitally represented information, such as a host image, with minimal degradation to the host information. Although the changes introduced by embedded data may be perceptible by a human observer, they need not be conspicuous. The goal of data hiding is not to restrict access to the host information, but rather to add the signature information to the host so that they can be distributed together. The ability to embed inconspicuous data makes data hiding attractive for adding signature information to digital and analog images.

Several known low-bit data hiding techniques afford encoding of information in a minimally perceptible fashion. Typically, however, recovery of the embedded data requires recreating specific details of the embedding process. Although this restriction makes the encoded information highly resistant to unauthorized removal, this resistance is generally purchased at the price of excluding the typical consumer of the image from accessing the encoded ownership or copyright information.

DESCRIPTION OF THE INVENTION

SUMMARY OF THE INVENTION

The invention exploits the relative insensitivity of the human visual system to discontinuities over a region of random texture to hide a figure, such as a logo, in the texture patterns of a still image. Specifically, the figure is encoded in an original image by altering the image in the following manner: copying an area having the shape of the figure to be embedded from one location of a texture field having a significant random or high-frequency component in the original image to a second nonoverlapping location in a similarly textured region of the same image. Several such figures can be encoded in a single image provided that it contains a sufficiently large area of appropriate textures.

Decoding the figure first requires locating the identically textured regions in the modified image. Correlating the image with a copy of itself is a convenient and well-known analytical technique enabling location of the copied information. The results of this autocorrelation indicate the relative placement of the modified image with respect to its copy that will align the identical regions. After positioning the modified image and the copy so as to align the repeated pattern segment in the copy with the original location of the pattern segment in the image, the copy is subtracted from the image. The resulting pixel brightness values at locations within the embedded figure have absolute values near zero, so that the dark shape of the figure is revealed. The outline of the figure against its surroundings is sharpened by resetting the brightness values falling under some threshold magnitude to black and the values greater than the threshold to white.

Since the source and target regions are identical, they are modified in the same way by any uniform transformation of the image. If the two regions are reasonably large, the inner part of the copied portion changes identically under most non-geometric transformations. Coded regions as small as 16×16 pixels have been found to be recoverable after the modified image is subjected to filtering, compression, and rotation.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE INVENTION

Figure 1:
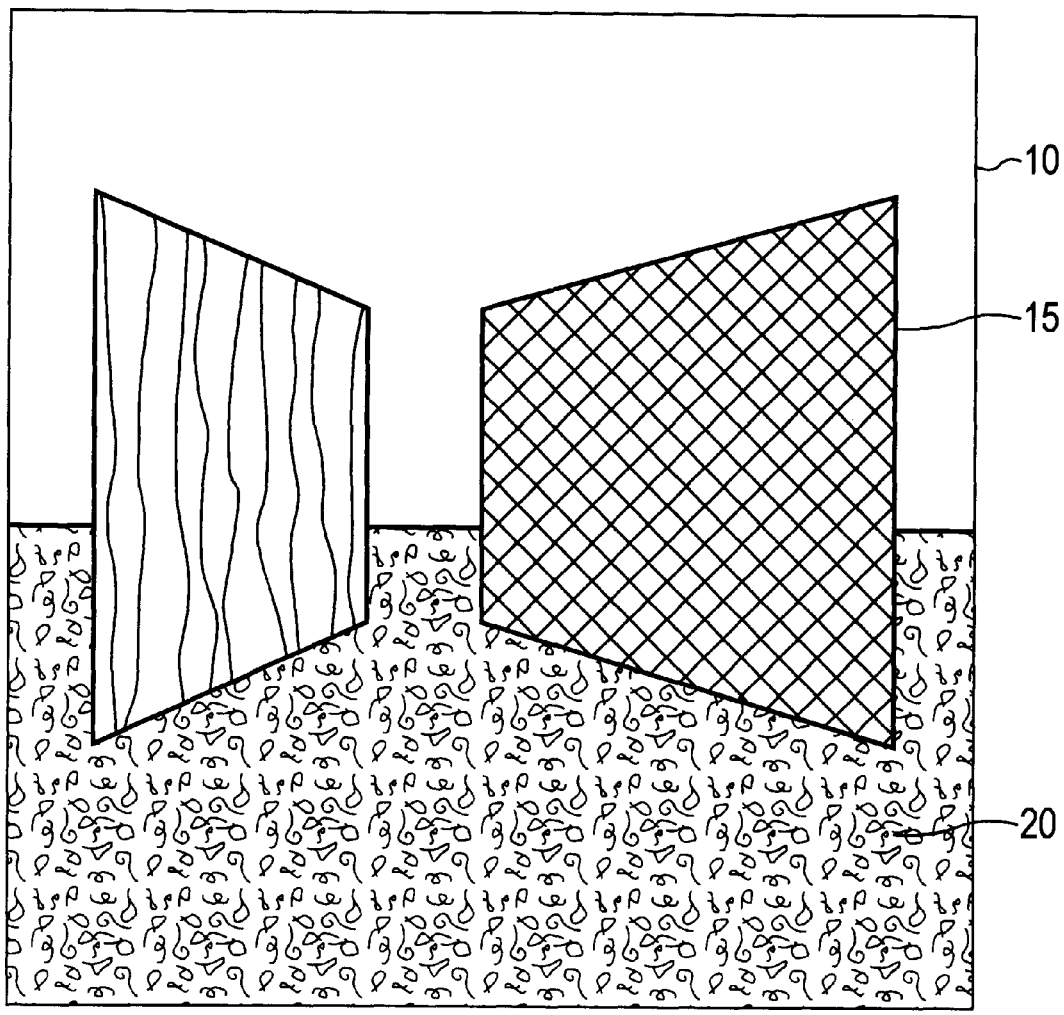
FIG. 1 is an image having several distinct texture patterns.

Embedding a figure according to the invention first requires identification of source and target regions in an original image, which may be in a digitally represented format or belong to an article such as a photographer's studio backdrop. To minimize the perceptibility of this change to a human viewer, both the source and target regions should have a similar color and/or mean brightness level and similar texture. Although texture in an image is readily understood as involving visually perceptible surface characteristics, no complete rigorous description of texture exists, and precise characterization of a given texture is problematic. However, the three most important perceptual aspects of processing of texture by humans have been identified. FIG. 1 shows an image 10 having fields exemplifying each of these, namely "repetitiveness", "directionality", and "granularity and complexity". A highly repetitive structure, for example the one covering the field 15, offers the strongest perceptual cue in texture discrimination. In general, the human visual system does not focus on the details of the texture covering a field in an image. Rather, it uses the textures in an image as a cue for partitioning the image into fields and then views the image as a collection of those fields without regard to the internal textural details. This is especially true of textures that are dominated by granularity and complexity, having a strong stochastic component, like the texture covering field 20. So, imperceptibility of the embedded figure is further enhanced if the common texture of the source and target regions has a strong random character. However, even highly periodic textures can be used satisfactorily if the are characterized by a sufficiently high spatial frequency.

A human operator may readily make this selection of strongly randomly textured areas by visual inspection. Generally, the regions of similar texture chosen are parts of the same field in the original image, so that both the source and target regions are comprised by a continuous or non-continuous field representing the same substance. Appropriately textured source and target regions may be identified by a human operator in a continuous texture pattern representing an expanse of a substance such as, for example, textile, hair, grass, sky, sand, shrubbery, or tree branches in the original image. However, the user may choose areas of the original image representing disparate substances—such as carpet and sand—as source and target regions with satisfactory results. It should be emphasized that, as used herein, the term "substance" connotes a single pictorial element associated with a characteristic, continuous, visually perceptible texture.

However, it is also possible to choose the source and target regions, or confirm the suitability of a operator's subjective selection, using some simple figure of merit or any of the many more complicated analytical models for texture that have appeared in the literature. For example, fine textures typically contain high frequency components; therefore the curvature of some parameter a, such as luminance, over the dimensions of the original image provides a useful metric of the granularity of a texture. In one approach, source and target regions of appropriately fine or random texture are identified by comparing $$\sum_{s_i} \frac{\partial^2 a}{\partial s_i^2},$$

evaluated over some set of directions s at points j, with some threshold value. Or, a region is deemed appropriate if the derivative $$\frac{\partial^2 a}{\partial s^2}$$

exceeds a threshold value at each of a set of points distributed over the region.

Texture can also be described statistically. One useful indicator is the sample standard deviation s of the parameter a:

$$s = \sqrt{\frac{\sum_{j=1}^{N} a_i^2 - \frac{1}{N}\left(\sum_{j=1}^{N} a_i\right)^2}{N-1}},$$

in which N is the number of points examined. In one approach, the standard of randomness is a threshold value that the sample standard deviation must exceed. More complex statistical models, however, can instead be employed to describe texture by a collection of statistics of selected features. One well-known statistical method for texture classification is the simultaneous autoregressive (SAR) model. This class of techniques, of which there are several variations, has been described, e.g., by J. Mao and A. Jain in *Pattern Recognition*, 25 (2), 175–188 [1992]. For a pattern of M×M pixels, a pixel parameter a(s) at location s=($s_1$,$s_2$) with $s_1$,$s_2$=1, 2, . . . , M is expressed as $$a(s) = \mu + \sum_{r \in D} \theta(r) g(s+r) + \varepsilon(s)$$

in which D is a set of pixels neighboring the pixel at site s; $\mu$ is the mean parameter value in the pattern; $\theta(r)$ characterizes the dependence of a pixel parameter value at one site on the values at neighboring sites; $\epsilon(s)$ is an independent Gaussian random variable with zero mean and variance $\sigma^2$. The model parameters can be estimated for a given region of the pattern using an appropriate statistical operation, such as least-squares error technique or maximum likelihood estimation. The standard deviation $\sigma$ derived from the model has a direct relationship to the granularity or "busyness" of the texture. Thus the observed value of $\sigma$ for a given region is an indicator of the randomness and fineness of the texture in that region; regions with values of $\sigma$ exceeding some threshold value are candidates for containing the source and target regions. Other useful criteria measure the relative importance of the random and periodic characters of the region's texture, for example the ratio of $\sigma$ to some figure representing the strength of $\theta(r)$ over the region.

Another useful approach to texture representation is the Wold-based texture model, described, e.g., by F. Liu and R. Picard in *MIT Media Laboratory Perceptual Computing Section Technical Report* No. 320. In this approach, the certainty with which a pattern can be characterized as either highly structured or as relatively unstructured is indicated by the ratio between the autocovariance small-displacement energy (defined below) and the total energy of the pattern, as described by the power spectrum. First, the power spectrum of the parameter a(x,y) used to characterize the pattern, equal to the square of the discrete Fourier transform A(u,v) of a, is calculated. The autocovariance $\rho_{ab}(x,y)$ of the array a(x,y) is computed as the inverse discrete Fourier transform ("DFT") of a's power spectrum $|A(u,v)|^2$ less the square of the mean value $\mu_a$. In order to define the covariance small displacement energy, a region is continuously grown outwardly starting from zero displacement until the square value of the autocovariance function is lower than a small percentage, such as 10%, of its maximum value. The energy in this region as described by the power spectrum is used as the covariance small displacement energy. Then the autocovariance energy ratio $$r_e = \frac{\text{small displacement energy}}{\text{total energy}}$$

is calculated for the pattern. Large values of $r_e$ indicate a strong stochastic component to the texture. A region of random texture appropriate for the source and target regions may be identified by requiring $r_e$ values greater than some threshold value, such as 20%.

Figure 2A:
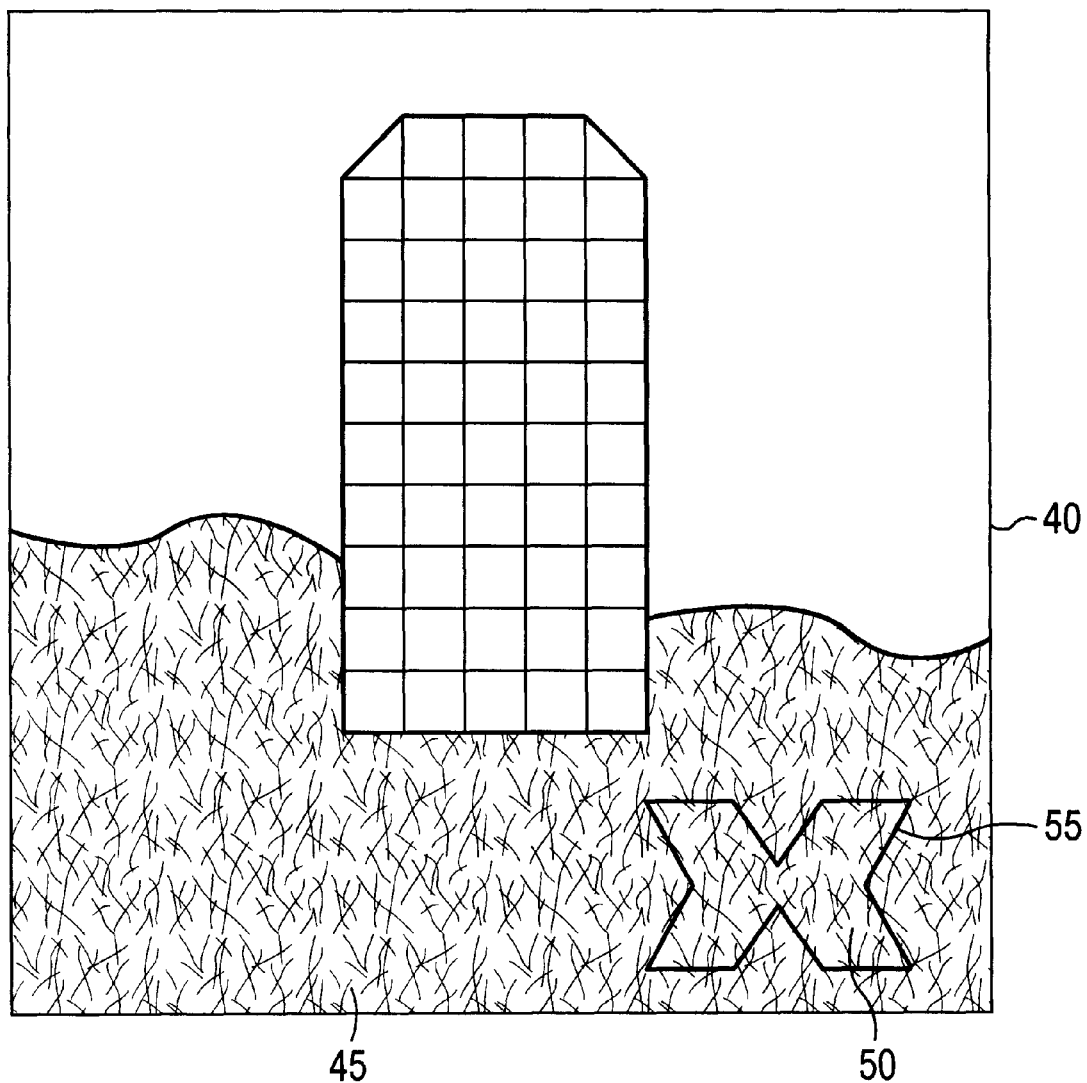
FIGS. 2A–2C schematically depict encoding according to the invention.
Figure 2B:
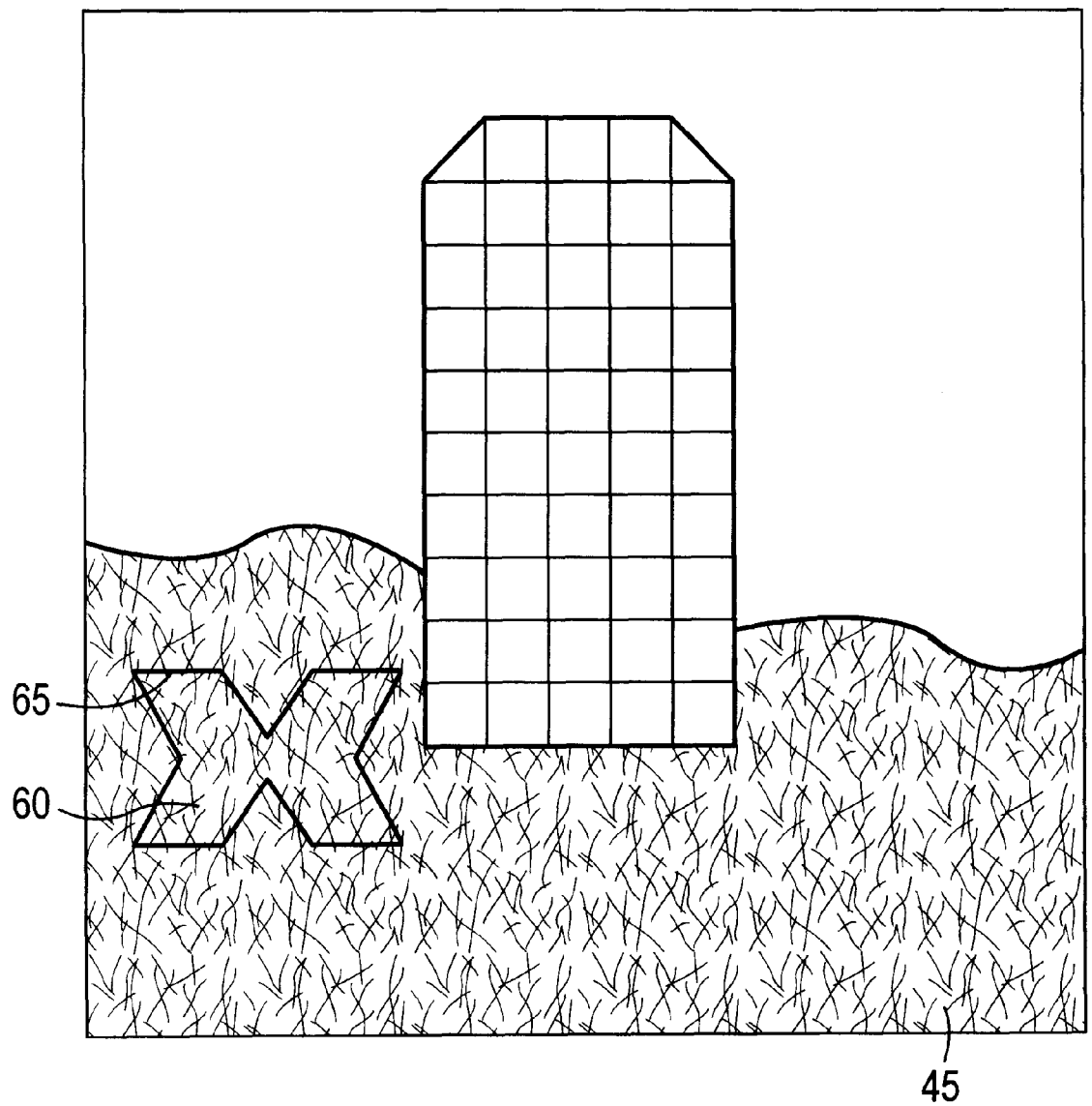
Figure 2C:
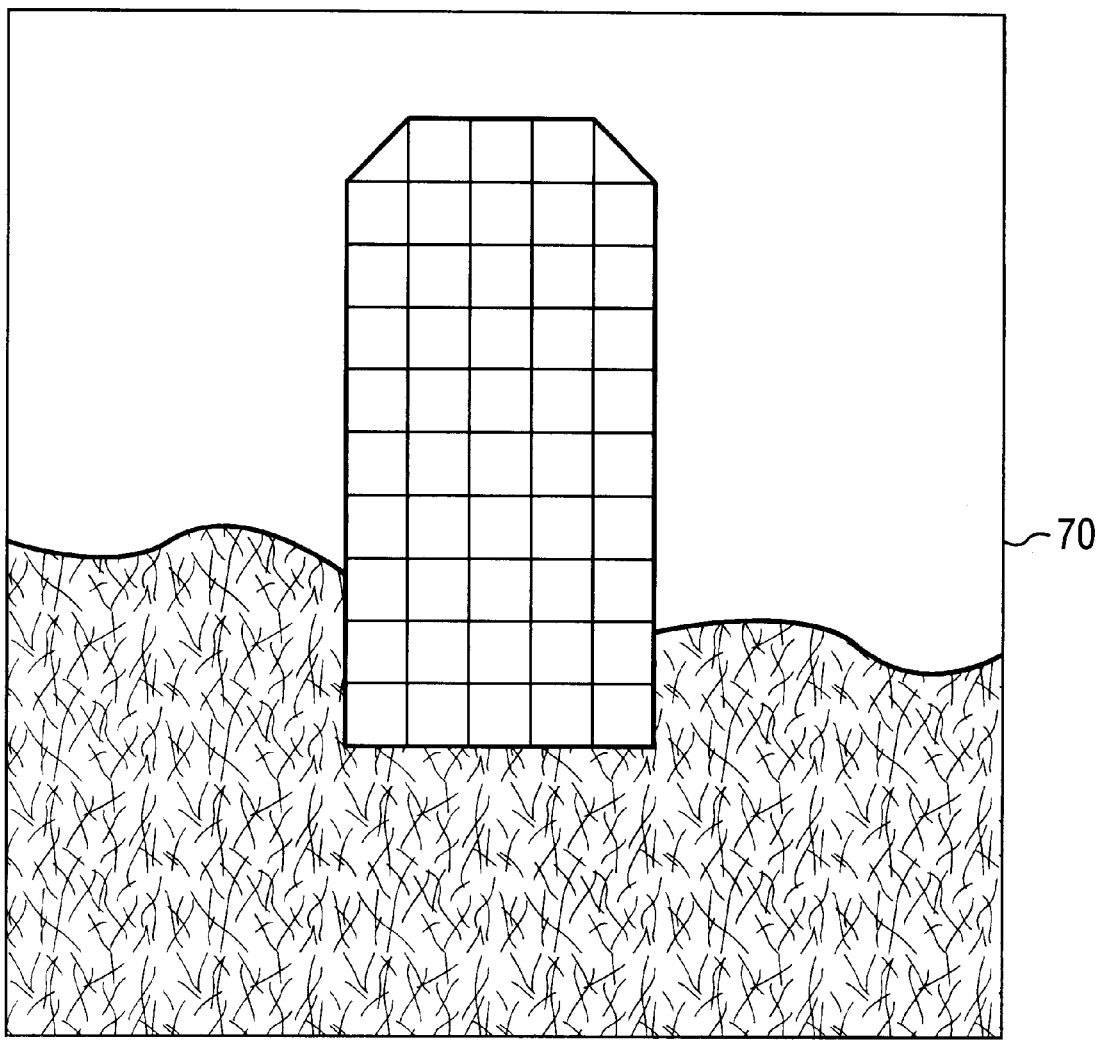

After appropriate source and target regions have been identified, a portion of the source region is copied onto the target region. With reference to FIG. 2A, an original image 40 has a field 45 patterned with a strongly random texture. In the figure, the source portion 50 is identified by a heavy added boundary 55 shaped like the figure to be embedded. In FIG. 2B, the source portion 50 has been copied onto the target region, creating a portion 60 of repeated information, emphasized by the heavy bounded curve 65, in the field 45. FIG. 2C shows the resulting modified image 70 containing the embedded figure. The noticeability of the portion copied to the target region may be reduced by applying embellishments that reduce the discontinuity at the edge of the copied portion. After embedding, the human operator may assess the visual impact of the modifications to the original image, or the impact may be evaluated algorithmically, e.g., by methods used for evaluating the effect of lossy compression.

Revealing the embedded figure requires finding the two identical regions in the modified image. Correlation is an analytical technique for comparing two data sets that is useful for finding similar regions in two images, as required for decoding. The correlation $\phi_{ab}(x,y)$ of two images described by the arrays $a(x,y)$ and $b(x,y)$, a and b representing some definitive encoded parameter such as luminance, is defined by $$\phi_{ab}(x,y) = \int_{-\infty}^{\infty}\int a(\xi-x, \eta-y)b(\xi,\eta)d\xi d\eta \qquad \text{equation 1}$$

For a given pair of coordinate values $(x_0,y_0)$, the integral $\phi_{ab}(x_0,y_0)$ includes the product of the parameter values at each point of one image with the value at the point in the other image and so provides a point-wise comparison of the patterns $a(x,y)$ and $b(x,y)$ in a coordinate system that is invariant to the shift $(x_0,y_0)$ between the origins of the images. Thus, the value of the correlation function $\phi_{ab}(x_0,y_0)$ expresses the similarity between patterns $a(x,y)$ and $b(x,y)$ when $a(x,y)$ is shifted by $(x_0,y_0)$ with respect to $b(x,y)$. For example, when the value of the correlation function $\phi_{ab}(x_0,y_0)$ is large and positive, then the pattern $b(x,y)$ resembles $a(x-x_0,y-y_0)$. A smaller positive value of $\phi_{ab}(x_0,y_0)$ would indicate a weaker resemblance. Negative values of $\phi_{ab}(x_0,y_0)$ would indicate that the patterns have an opposite behavior with respect to the parameter being correlated.

If $a(x,y)=b(x,y)$, then equation 1 defines the autocorrelation $\phi_{aa}(x_0,y_0)$ of the pattern $a(x,y)$. Autocorrelation is an efficient way of finding large-scale, low-frequency repetition in an image, as introduced by the figure embedding. An equivalent manual process is to tile eight copies around the modified image to simulate wraparound, align another copy over the central modified image and then displace the copy parallel to the plane of the tiled images to find the coincidence of identical regions of the modified image and its copy. The autocorrelation of any function has a maximum at $(x_0,y_0)=(0,0)$, trivially indicating that the pattern $a(x,y)$ most strongly resembles its unshifted self. However, $\phi_{aa}(x_0,y_0)$ will have large positive values for other values of $(x_0,y_0)$ if $a(x,y)$ is periodic or if one portion of the pattern is repeated at another different location in the image, as is the case in an image carrying information encoded according to the present invention. Thus, a large positive value of $\phi_{aa}(x_0,y_0)$ can be used to indicate the shift $(x_0,y_0)$ of a modified image with respect to itself that is needed to bring the identical source and target portions into coincidence. It should be understood that $a(x,y)$ and $b(x,y)$ need not be arrays of discrete values but could also be represented as continuous functions or a sampled signal.

Once the results of an image autocorrelation have been used to align the identical portions of the modified image and its copy, the embedded figure is decoded by subtracting the parameter values of the image from those in the copy at the points having the same coordinates. The difference will have parameter values very close in absolute value to zero at locations corresponding to the replaced portion. Squaring each of the resulting parameter values creates a output difference image having a dark area shaped like the embedded figure. The figure may be made more clearly visible by resetting all squared values falling below some small threshold level, such as 4 for a 256-level system, to a reset value, such as black, and setting the squared values falling above the threshold level to white.

In another embodiment of the invention, only part of the frequency spectrum is used for embedding and revealing the figure. Because of the relative insensitivity of the human visual system to information contained in the higher spatial frequencies, copying only those frequencies from the source portion to the target region usually results in a less-noticeable embedded figure than if the entire spectrum is copied. In this embodiment, the original image is processed by a low-pass filter. The output from the filter is subtracted from the signal of the original image, so that only the higher-frequency components of the original image are manipulated for figure embedding. The high-frequency encoded signal containing the embedded figure is then added to the low-frequency components passed by the filter to restore the large-scale structure of the modified image. To decode a figure embedded in this way, the modified image is first processed by the same low-pass filter used before embedding. The high-frequency portion of the modified image is autocorrelated to find the repeated portion and the difference taken to reveal the figure, as already described.

Alternatively, the figure may be embedded by treating only the lower-frequency portion of the original image spectrum. In this case, the image is processed according to the same procedure using instead a high-pass filter. If the figure is thus embedded, the encoded information will be considerably more resistant to obliteration by operations that remove high-frequency information from the modified image, such as lossy compression.

The figure embedding process can be automated by having a computer select the source and target regions. The computer evaluates the textures in the original image according to one of the quantitative criteria already discussed applied to pixel parameter values. Or the computer can be programmed to compare textures in the original image with one or more archetype patterns, such as sample from the Brodatz texture database, known to perform well for this application. The similarity between an image texture and an archetype can be assessed by a known image classification technique. For example, SAR techniques measure similarity according to a classifier, such as the Mahalanobis distance, of the total distance between the vector of features (e.g., $\theta(r)$ and $\sigma^2$) of the model for a first texture pattern and the feature vector of the model for a second texture pattern. Wold-based models decompose the 2-dimensional random field $a(x,y)$ of a texture pattern into three mutually orthogonal components: harmonic, evanescent (both deterministic), and indeterministic. Features from both the deterministic and indeterministic descriptions are used to determine similarity between texture patterns.

Complete automation of the figure embedding also requires unsupervised partitioning of the original image into texturally distinct fields. Several approaches to segmentation, based on different texture models, have been described in the literature. These generally use a k-mean-based clustering algorithm. One drawback to unsupervised partitioning procedures is that original images without moderately large areas of continuous texture may not be optimally segmented.

Figure 3:
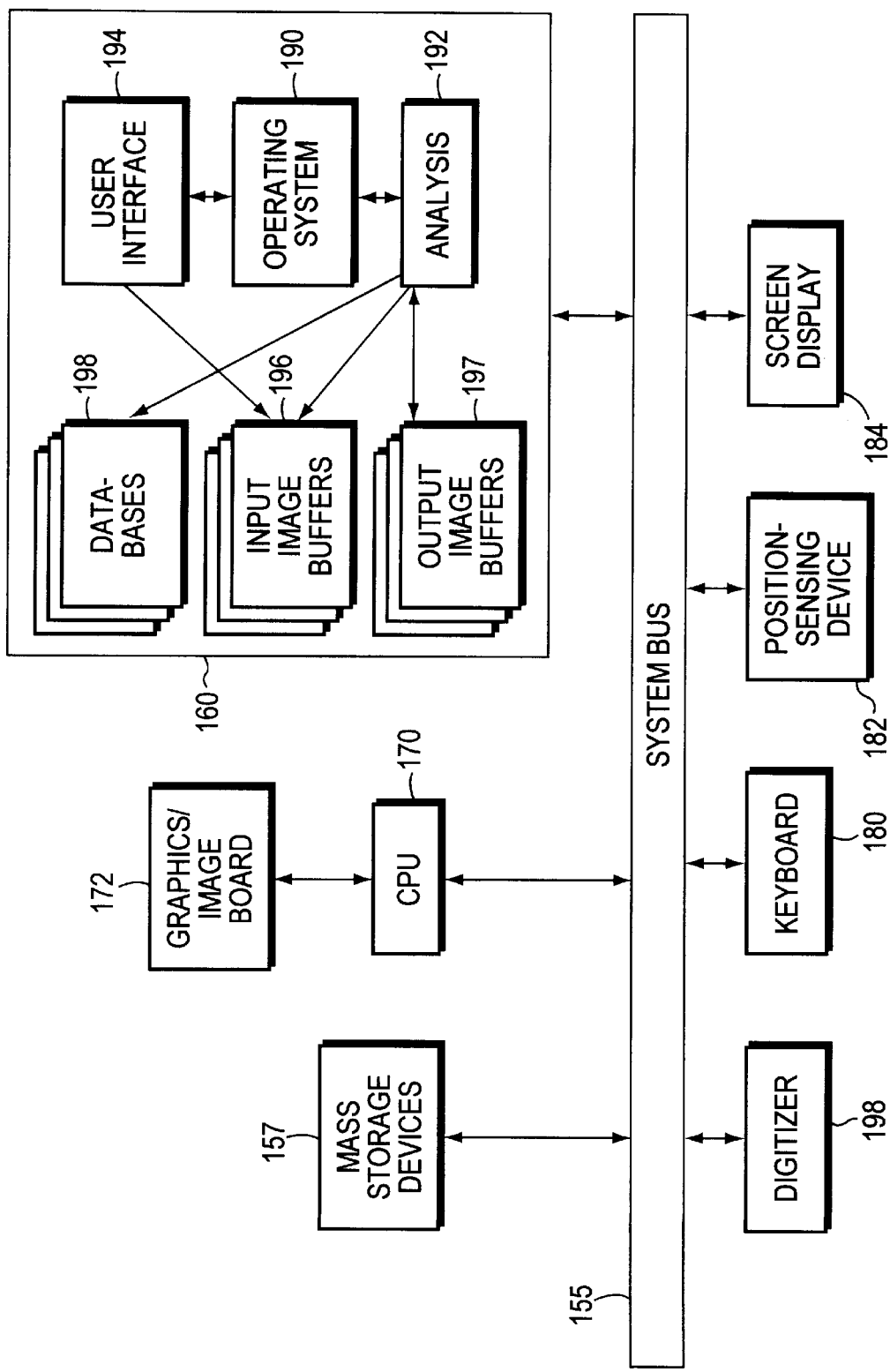
FIG. 3 schematically illustrates a representative hardware environment for the present invention.

Refer now to FIG. 3, which illustrates, in block-diagram form, a hardware system incorporating the invention. As indicated therein, the system includes a system bus 155, over which all system components communicate, a mass storage device (such as a hard disk or optical storage unit) 157 as well as a main system memory 160.

The operation of the illustrated system is directed by a central-processing unit ("CPU") 170. To facilitate rapid execution of the image-processing operations hereinafter described, the system preferably contains a graphics or image-processing board 172; this is a standard component well known to those skilled in the art.

The user interacts with the system using a keyboard 180 and a position-sensing device (e.g., a mouse) 182. The output of either device can be used to designate information or select particular areas of a screen display 184 to direct functions to be performed by the system.

The main memory 160 contains a group of modules that control the operation of CPU 170 and its interaction with the other hardware components. An operating system 190 directs the execution of low-level, basic system functions such as memory allocation, file management and operation of mass storage devices 157. At a higher level, an analysis module 192, implemented as a series of stored instructions, directs execution of the primary functions performed by the invention, as discussed below: instructions defining a user interface 194 allow straightforward interaction over screen display 184. User interface 194 generates words or graphical images on display 184 to prompt action by the user, and accepts user commands from keyboard 180 and/or position-sensing device.

The main memory 160 also includes one or more input image buffers 196 that contain image(s), such as an original or modified image, used as input for processing according to the invention and output image buffers 197 that contain an output image generated by that processing. The contents of each input or output image buffer define a "raster," i.e., a regular two-dimensional pattern of discrete pixel positions that collectively represent an image and may be used to drive (e.g., by means of image-processing board 172 or an image server) screen display 184 to display that image. The values of pixel parameters, such as luminance, contained at each memory location in an image buffer 196 or 197 directly governs the appearance of a corresponding pixel on display 184.

One or more databases 198 may contain encoding parameters, e. g., the shape(s) and size(s) of the figure(s) to be embedded, locations of the source and target regions, criteria for selecting source and target regions, the partition of the image into fields, archetype texture patterns for comparison with textures in the original image, or texture models for texture evaluation and image segmentation. One of the databases 198 may also contain information auxiliary to the interpretation of the autocorrelation results for decoding, e.g., concerning periodic structure in the original image, the number of figures embedded. One or more of the databases 198 may be associated with each one of the image buffers 196 or 197 and contain information specific to the image contained in the associated buffer; or, one database 198 may contain information used for encoding data in several different original images. The databases may be stored in the mass storage device 157 in file(s) linked to file(s) containing the associated image(s).

It must be understood that although the modules of main memory 160 have been described separately, this is for clarity of presentation only; so long as the system performs all necessary functions, it is immaterial how they are distributed within the system and its programming architecture. Likewise, although conceptually organized as grids, pixelmaps need not actually be stored digitally in this fashion. Rather, for convenience of memory utilization and transmission, the raster pattern is usually encoded as an ordered array of pixels.

The original or modified image may be provided in electronic or hardcopy format, in which case the image is processed by a digitizer 198 before encoding or decoding. The digitized image is sent as bitstreams on the bus 155 to an image buffer 196 of the main memory 160. The original or modified image may be stored in the mass storage device 157 as well as in image buffers 196.

As noted above, execution of the key tasks associated with the present invention is directed by analysis module 192, which governs the operation of CPU 170 and controls its interaction with main memory 160 in performing the steps necessary to embed a figure in an original image or to reveal the figure in a modified image.

Figure 4:
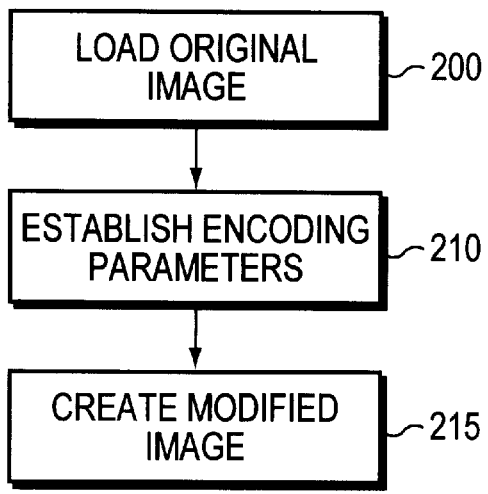
FIG. 4 is a flow chart illustrating encoding according to the invention.

In particular, the procedure followed by the hardware system for encoding a statistic in a host image is shown in FIG. 4. In a first step 200, the original image is loaded into a first one of input image buffers 196, so that it is available to analysis module 192. Then the module 192 establishes the encoding parameters in step 210. These parameters include the shape and size of the figure to be embedded and the locations of the source and target regions. In response to a user command, the module 192 either retrieves these parameters from the user interface 194 or the appropriate database 198; the source and target regions may be determined based on the considerations outlined previously herein. The values determined for the parameters may be retained in one of the databases 198.

In step 215, the analysis module 192 creates the modified image by copying a portion of the source region shaped like the figure over a similarly-shaped portion of the target region. Specifically, the analysis module 192 replaces the pixel values of the locations in the target portion with those of the portion of the source region. This step may be repeated several times. The modified image is then stored in one of the output image buffers 197.

Figure 5:
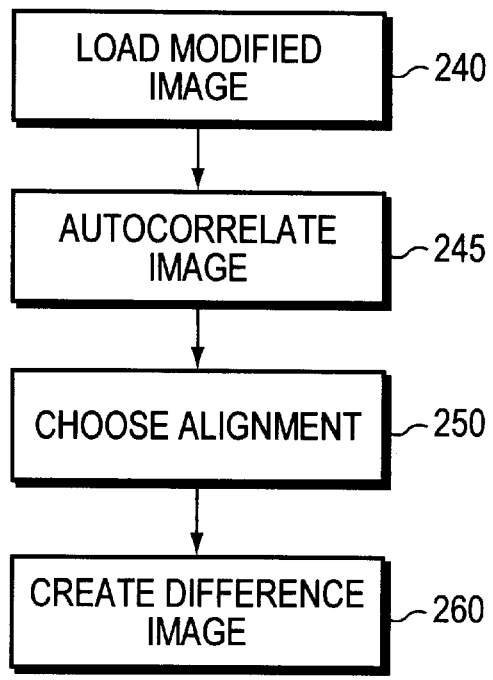
FIG. 5 is a flow chart illustrating decoding according to the invention.

As shown in FIG. 5, for decoding a particular statistic in a modified image, in the first step 240, the image is first loaded into one of the image buffers 162. In step 245, the module 192 performs the autocorrelation. In step 250, the analysis module 192 examines the autocorrelation values generated in step 240 and, in light of user input or of information retrieved from one of the databases 198, chooses a shifting transformation associated with arguments producing a large value of the autocorrelation function. In step 260, the analysis module 192 pairs locations in the modified image in accordance with the shift, subtracts pixel parameter values of one member of each pair from the other member of the same pair, squares each of the resulting differences, and generates an output image from the parameter differences. The output image is stored in one of the output image buffers 197. Based on the appearance of the output image and the available decoding information, steps 250 and 260 may be repeated several times.

It will therefore be seen that the foregoing represents a highly extensible and advantageous approach to low-bit-rate data embedding, especially for signature marking of digitally represented images. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method of embedding an imperceptible figure in an original image encoded as points, each of which has a parameter value, the image having fields over which the arrangement of parameter values generates texture patterns, the method comprising the steps of:
   a. identifying an encoding field in the original image, the encoding field having a continuous texture pattern;
   b. identifying in the encoding field a source portion at an original location and a target portion at a target location, the target portion not overlapping the source portion, both portions being shaped like the figure; and
   c. generating an altered image having identical source and target portions by copying the source portion over the target portion so as to replace parameter values in the target portion with a repeated pattern segment, thereby embedding the figure.

2. The method of claim 1 wherein the encoding field texture pattern has a significant high-frequency component.

3. The method of claim 1 wherein the field texture pattern has a random component.

4. The method of claim 1 wherein the portions are identified by visual inspection.

5. The method of claim 1 wherein the portions are chosen automatically by a computer.

6. The method of claim 1 wherein the step of identifying the encoding field is performed based on a sample variance of the parameter values assumed at points in the encoding field.

7. The method of claim 1 wherein the step of identifying the encoding field is performed based on the curvature of the parameter values assumed at points in the encoding field.

8. The method of claim 1 wherein the step of identifying the encoding field is performed based on simultaneous autoregressive model parameters derived from the parameter values assumed at points in the encoding field.

9. The method of claim 1 wherein the encoding field texture pattern has a periodic component and a random component and the step of identifying the encoding field is performed based on the relative strengths of the periodic and random components.

10. The method of claim 8 wherein the step is identifying the encoding field is based on the magnitude of a standard deviation of a Gaussian random variable.

11. The method of claim 9 wherein the step of identifying the encoding field is performed based on the ratio of the autocovariance small-displacement energy and the total energy of the encoding field texture pattern.

12. The method of claim 1 wherein the step of identifying the encoding field is performed based on the similarity of the encoding field texture pattern to an archetype texture pattern.

13. The method of claim 1 wherein the points are represented as electronically encoded pixels.

14. The method of claim 1 wherein the image is a photography backdrop.

15. The method of claim 1 further comprising the step of partitioning the image into fields.

16. The method of claim 1 further comprising the step of passing the original image through a filter before generating the altered image.

17. The method of claim 16 wherein the filter is a low-pass filter.

18. The method of claim 16 wherein the filter is a high-pass filter.

19. The method of claim 16 wherein the step of passing the original image through a filter removes a portion of the original image frequency spectrum and further comprising the step of adding the removed portion to the altered image.

20. The method of claim 1 wherein the parameter is luminance.

21. The method of claim 1 wherein the parameter is chrominance.

22. The method of claim 11 wherein the value of the ratio is greater than 20%.

23. A method of embedding an imperceptible figure in an original image encoded as points, each of which has a parameter value, the image having fields over which the arrangement of parameter values generates texture patterns, the method comprising the steps of:
   a. selecting in the original image a source region at an original location having a source texture pattern and a target region at a target location having a target texture pattern, the source and target texture patterns being visually similar; and
   b. generating an altered image by copying a source portion of the source region over a target portion of the target region, the source and target portions not overlapping and both being shaped like the figure, so as to replace parameter values in the target portion with a repeated pattern segment, the altered image having identical source and target portions, thereby embedding the figure.

24. The method of claim 23 wherein the source and target regions are part of an encoding field representing a substance.

25. The method of claim 23 wherein the region selection step is performed based on the similarity of the source and target texture patterns as determined by visual inspection.

26. The method of claim 23 wherein the source and target texture patterns each have a random component.

27. The method of claim 23 wherein the region selection step is performed based on the similarity of the source and target texture patterns to one another as determined automatically by a computer.

28. The method of claim 27 wherein the similarity of the source and target texture patterns to one another is determined based on the similarity of each of the source and target texture patterns to at least one archetype pattern.

29. The method of claim 28 wherein the similarity of each of the source and target texture patterns to the at least one archetype pattern is determined based on a simultaneous autoregressive model of the texture patterns.

30. The method of claim 28 wherein the similarity of each of the source and target texture patterns to the at least one archetype pattern is determined using a Wold-based model of the texture patterns.

31. The method of claim 27 wherein the similarity of the source and target texture patterns to one another is determined using a simultaneous autoregressive model of the texture patterns.

32. The method of claim 27 wherein the similarity of the source and target texture patterns to one another is determined using a Wold-based model of the texture patterns.

33. The method of claim 23 further comprising the step of partitioning the image into fields.

34. The method of claim 23 wherein the points are represented as electronically encoded pixels.

35. The method of claim 23 wherein the image is a photography backdrop.

36. The method of claim 23 further comprising the step of passing the original image through a filter before generating the altered image.

37. The method of claim 36 wherein the filter is a low-pass filter.

38. The method of claim 36 wherein the filter is a high-pass filter.

39. The method of claim 36 wherein the step of passing the original image through a filter removes a portion of the original image frequency spectrum and further comprising the step of adding the removed portion to the altered image.

40. The method of claim 23 wherein the parameter is luminance.

41. The method of claim 23 wherein the parameter is chrominance.

42. The method of claim 23 wherein the source and target texture patterns each has a significant high-frequency component.

43. A method of detecting a figure embedded in an original image encoded as points, each of which has a parameter value, the image having fields over which the arrangement of parameter values generates texture patterns, the method comprising the steps of:

a. electronically encoding an altered image as an array of pixels, each having a pixel parameter value, the altered image having a source portion at an original location having a source texture pattern copied onto a target portion at a target location having a target texture pattern, the target portion not overlapping the source portion, the portions being shaped like the figure, so as to replace parameter values in the target portion with a repeated pattern segment, the altered image having identical source and target portions embedding the figure;

b. generating an electronically encoded copy of the altered image;

c. correlating the pixel parameter values in the altered image and the copy so as to generate an indication of relative placement of the original location in the altered image with respect to the target location in the copy;

d. positioning the altered image and the copy so as to align the repeated pattern segment at the target location with the original location; and e. subtracting parameter values in one of the aligned altered image and the copy from parameter values in the other of the aligned altered image and the copy so as to identify the figure.

44. The method of claim 43 wherein the step of identifying the figure at the second location comprises the steps of:

a. assigning correspondences between pixels of the copy and pixels of the altered image so as to align the location in the altered image and the second location in the copy;

b. subtracting the pixel values of the altered image from the corresponding pixel values of the copy to generate difference values associated with the corresponding image pixels; and c. squaring the difference values, thereby generating an output image displaying the decoded figure.

45. The method of claim 44 further comprising the step of resetting to a reset value the pixel parameter of image pixels associated with difference values having a magnitude smaller than a predetermined number so as to clarify the appearance of the figure.

46. The method of claim 43 wherein the pixel parameter is luminance.

47. The method of claim 43 wherein the pixel parameter is chrominance.

48. A method of detecting a figure embedded in an original image encoded as points, each of which has a parameter value, the image having fields over which the arrangement of parameter values generates texture patterns, by using a filter to separate a section of the original image frequency spectrum from the original image and thereby provide a complementary original image the method comprising the steps of:

a. electronically encoding an altered image as an array of pixels, each having a pixel parameter value, the altered image comprising an altered complementary image in the separated section of the original image frequency spectrum, the altered complementary image having a source portion at an original location, the source portion having a source texture pattern, copied onto a target portion at a target location, the target portion having a target texture pattern—the target portion not overlapping the source portion, the portions both being shaped like the figure—thereby replacing parameter values in the target portion with a repeated pattern segment, the altered complementary image having identical source and target portions embedding the figure;

b. passing the electronically encoded altered image through the filter used to filter the original image so as to generate the altered complementary image;

c. generating an electronically encoded copy of the altered complementary image;

d. correlating the pixel parameter values in the altered complementary image and the copy so as to generate an indication of relative placement of the original location in the altered complementary image with respect to the target location in the copy;

e. positioning the altered complementary image and the copy so as to align the repeated pattern segment at the target location with the original location; and f. subtracting parameter values in one of the aligned altered complementary image and the copy from parameter values in the other of the aligned altered image and the copy so as to identify the figure.

49. The method of claim 48 wherein the step of identifying the figure at the second location comprises the steps of:

a. assigning correspondences between pixels of the copy and pixels of the altered complementary image so as to align the location in the altered complementary image and the second location in the copy;

b. subtracting the pixel values of the altered complementary image from the corresponding pixel values of the copy to generate difference values associated with the corresponding image pixels; and c. squaring the difference values, thereby generating an output image displaying the decoded figure.

50. An apparatus for embedding an imperceptible figure in an original image electronically encoded as pixels, each of which has a pixel parameter value, the image having fields over which the arrangement of parameter values generates texture patterns, the apparatus comprising:

a. a computer memory for storing the original image as an ordered set of pixels;

b. means for identifying an encoding field in the original image, the encoding field having a continuous texture pattern;

c. means for identifying in the encoding field a source portion at an original location and a target portion at a target location, the source and target portions not overlapping and both shaped like the figure; and d. means for creating an altered image by copying the pixel parameter values of the source portion over the pixel parameter values of the target portion so as to replace the parameter values of the target portion with a repeated pattern segment, the altered image having identical source and target portions, thereby embedding the figure.

51. The apparatus of claim 50 wherein the means for identifying the encoding field identifies the encoding field based on a sample variance of the pixel parameter values assumed at pixels in the encoding field.

52. The apparatus of claim 50 wherein the means for identifying the encoding field identifies the encoding field based on the curvature of the pixel parameter values assumed at pixels in the encoding field.

53. The apparatus of claim 50 wherein the means for identifying the encoding field identifies the encoding field based on simultaneous autoregressive model parameters derived from the pixel parameter values assumed at pixels in the encoding field.

54. The apparatus of claim 53 wherein the means for identifying the encoding field identifies the encoding field based on the magnitude of a standard deviation of a Gaussian random variable.

55. The apparatus of claim 50 wherein the encoding field texture pattern has a periodic component and a random component and the means for identifying the encoding field identifies the encoding field based on the relative strengths of the periodic and random components.

56. The apparatus of claim 55 wherein the means for identifying the encoding field identifies the encoding field based on the ratio of the autocovariance small-displacement energy and the total energy of the encoding field texture pattern.

57. The apparatus of claim 56 wherein the means for identifying the encoding field does not select a field if the value of the ratio for the texture pattern of that field is less than 20%.

58. The apparatus of claim 50 further comprising a computer memory for storing at least one archetype texture pattern and wherein the means for identifying the encoding field identifies the encoding field based on the similarity of the encoding field texture pattern to the at least one archetype texture pattern.

59. The apparatus of claim 50 further comprising means for partitioning the image into fields.

60. The apparatus of claim 50 further comprising means for removing a portion of the original frequency spectrum of the original image.

61. The apparatus of claim 60 wherein the spectrum-portion-removing means is a low-pass filter.

62. The apparatus of claim 60 wherein the spectrum-portion-removing means is a high-pass filter.

63. The method of claim 50 wherein the pixel parameter is luminance.

64. The method of claim 50 wherein the pixel parameter is chrominance.

65. An apparatus for embedding an imperceptible figure in an original image electronically encoded as pixels, each of which has a pixel parameter value, the image having fields over which the arrangement of parameter values generates texture patterns, the apparatus comprising:
  a. a computer memory for storing the original image as an ordered set of pixels;
  b. means for identifying in the original image a source region having a source texture pattern and a target region having a target texture pattern, the source and target texture patterns being visually similar;
  c. means for creating an altered image by copying pixel parameter values of a source portion of the source region over a target portion of the target region, the source and target portions not overlapping and both portions being shaped like the figure, so as to replace the parameter values in the target portion with a repeated pattern segment, the altered image having identical source and target portions, thereby embedding the figure.

66. The apparatus of claim 65 wherein the means for identifying the regions identifies the regions based on the similarity of the source and target texture patterns as determined by a simultaneous autoregressive model of the texture patterns.

67. The apparatus of claim 65 wherein the means for identifying the regions identifies the regions based on the similarity of the source and target texture patterns as determined by a Wold-based model of the texture patterns.

68. The apparatus of claim 65 further comprising a computer memory for storing at least one archetype texture pattern and wherein the means for identifying the regions identifies the regions based on the similarity of each of the source and target texture patterns to the at least one archetype pattern.

69. The apparatus of claim 68 wherein the means for identifying the regions determines the similarity of each of the source and target texture patterns to the at least one archetype pattern based on a simultaneous autoregressive model of the texture patterns.

70. The apparatus of claim 68 wherein the means for identifying the regions determines the similarity of each of the source and target texture patterns to the at least one archetype pattern based on a Wold-based model of the texture patterns.

71. The apparatus of claim 65 further comprising means for partitioning the image into fields.

72. The apparatus of claim 65 further comprising means for removing a portion of the original frequency spectrum of the original image.

73. The apparatus of claim 72 wherein the spectrum-portion-removing means is a low-pass filter.

74. The apparatus of claim 72 wherein the spectrum-portion-removing means is a high-pass filter.

75. The apparatus of claim 65 wherein the pixel parameter is luminance.

76. The apparatus of claim 65 wherein the pixel parameter is chrominance.

77. An apparatus for detecting a figure embedded in an original image encoded as points, each of which has a parameter value, the image having fields over which the arrangement of parameter values generates texture patterns, the apparatus comprising:
  a. a computer memory for storing the altered image as an array of pixels, each having a pixel parameter value, the altered image having a source portion at an original location copied onto a target portion at a target location, the target portion not overlapping the source portion, the portions being shaped like the figure, so as to replace the parameter values in the target portion with a repeated pattern segment, the altered image having identical source and target portions embedding the figure;
  b. means for generating an electronically encoded copy of the altered image;
  c. means for autocorrelating the pixel parameter values in the altered image and the copy so as to generate an indication of relative placement of the original location in the altered image with respect to the target location in the copy;

d. means for positioning the altered image and the copy so as to align the repeated pattern segment at the target location with the original location; and e. means for subtracting pixel parameter values in one of the aligned altered image and the copy from parameter values in the other of the aligned altered image and the copy so as to identify the figure.

78. The apparatus of claim 77 wherein the means for identifying the figure at the second location comprises:

a. means for assigning correspondences between pixels of the copy and pixels of the altered image so as to align the location in the altered image and the second location in the copy;

b. means for subtracting the pixel values of the altered image from the corresponding pixel values of the copy to generate difference values associated with the corresponding image pixels; and c. means for squaring the difference values, thereby generating an output image displaying the decoded figure.

79. The apparatus of claim 77 further comprising means for resetting to a reset value the pixel parameter of image pixels associated with difference values having a magnitude smaller than a predetermined number so as to clarify the appearance of the figure.

80. The apparatus of claim 77 wherein the pixel parameter is luminance.

81. The apparatus of claim 77 wherein the pixel parameter is chrominance.

82. The apparatus of claim 77 further comprising means for removing a portion of the original frequency spectrum of the altered image.

83. The apparatus of claim 82 wherein the spectrum-portion-removing means is a low-pass filter.

84. The apparatus of claim 82 wherein the spectrum-portion-removing means is a high-pass filter.

85. The method of claim 43 wherein pairing locations in the altered image with locations in the copy in accordance with the relative displacement constitutes the step of positioning the altered image and the copy so as to align the target location with the original location.

86. The method of claim 48 wherein pairing locations in the complementary altered image with locations in the copy in accordance with the relative displacement constitutes the step of positioning the complementary altered image and the copy so as to align the target location with the original location.

87. The apparatus of claim 77 wherein the means for positioning the altered image and the copy so as to align the target location with the original location pairs locations in the altered image with locations in the copy.

\* \* \* \* \*